United States Patent [19]

Ozawa et al.

[11] 4,175,176

[45] Nov. 20, 1979

[54] SOLVENT RESISTANT ACRYLIC RESIN COMPOSITION

[75] Inventors: Kohe Ozawa, Yokohama; Kazuhiro Hosoya, Tokyo; Jiro Kurita, Yokohama; Makoto Honda, Tokyo, all of Japan

[73] Assignee: Asahi Kasei Kogyo Kabusihiki Kaisha, Osaka, Japan

[21] Appl. No.: 803,283

[22] Filed: Jun. 3, 1977

[51] Int. Cl.$^2$ ............................................ C08F 220/14
[52] U.S. Cl. .................................. 526/309; 526/328.5
[58] Field of Search ..................... 526/309, 328.5, 328, 526/329.7

[56] References Cited

U.S. PATENT DOCUMENTS

| | | | |
|---|---|---|---|
| 3,803,111 | 4/1974 | Munro et al. | 526/328.5 |
| 3,968,059 | 7/1976 | Shimada et al. | 526/328.5 |
| 3,968,090 | 7/1976 | Shimada et al. | 526/328.5 |

*Primary Examiner*—Harry Wong, Jr.
*Attorney, Agent, or Firm*—Armstrong, Nikaido, Marmelstein & Kubovcik

[57] ABSTRACT

A novel three-component type acrylic resin composition comprising a $C_3$–$C_8$ alkyl ester of acrylic acid, methyl acrylate and methyl methacrylate in a specific ratio. Such composition can be readily molded into a shaped article which is excellent in solvent resistance even upon being fabricated. The composition of the present invention is also featured by its good heat distortion temperature and mechanical strength, as compared to the conventional acrylic resin composition.

8 Claims, 1 Drawing Figure

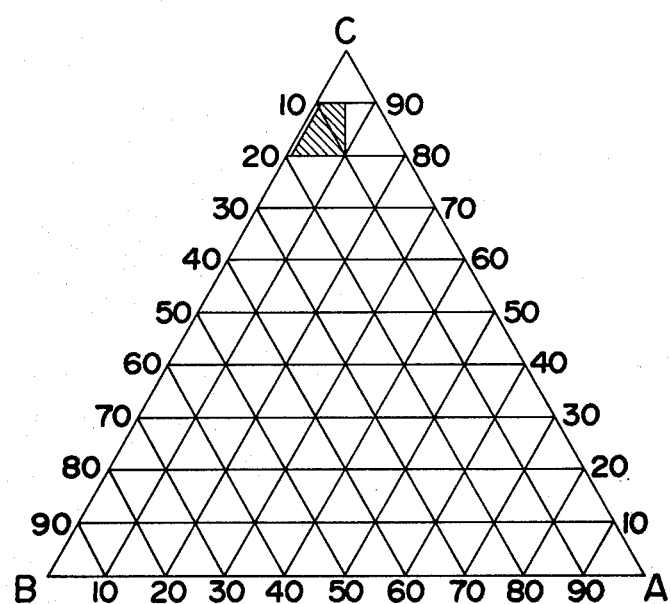

SOLVENT RESISTANT ACRYLIC RESIN COMPOSITION

This invention relates to a solvent resistant acrylic resin composition which is excellent in moldability, transparency and heat distortion resistance as well as solvent resistance. More particularly, this invention is concerned with a solvent resistant acrylic resin composition comprising an alkyl ester of an acrylic acid, methyl acrylate and methyl methacrylate in a specific ratio.

It is one and principal object of the present invention to provide an acrylic resin composition which is resistant to various solvents, for example those used as the adhesives and the thinners for coating material, such as dichloromethane, xylene and the like so that there is caused no crazing even when the article molded from the resin composition is contacted with the solvent at its portions having internal strains caused by fabrication such as heat bending or drilling of a plate or other shaped articles made from the resin composition, and which is excellent in moldability, transparency and heat distortion resistance.

Conventional acrylic resin compositions generally comprise methyl methacrylate alone or a major part of methyl methacrylate and a small part of other monomer components copolymerizable with methyl methacrylate such as methyl acrylate, ethyl acrylate and the like, and have an average molecular weight of 100,000 to 4,000,000. Use of the conventional acrylic resin composition is varied depending on its average molecular weight. The resin compositions having an average molecular weight of 100,000 to 600,000 are used as the products obtained by injection molding, extrusion molding or blow molding, and those having an average molecular weight of 600,000 to 4,000,000 are used as the products obtained by a cast method. The latter products are obtained mainly in the form of a plate. The cast method consists in pouring methyl methacrylate monomers together with a polymerization initiator or their partial polymer into a combination of two plates of substrates (tempered glass or metal) with a gasket provided therebetween through a gap formed therein, heating them to effect polymerization and removing the substrates to obtain an acrylic resin composition.

The acrylic resin compositions having an average molecular weight of 100,000 to 600,000 are usually obtained by suspension polymerization. Besides, they may be obtained by other conventional polymerization methods such as bulk polymerization. The acrylic resin compositions of such range of average molecular weight are excellent in moldability, and hence can be easily molded by various molding methods, for example, injection molding, extrusion molding, blow molding and vacuum molding to produce articles having excellent properties inherent of an acrylic resin, that is, articles which are excellent with respect to weatherability, light transmission, surface luster, surface hardness and high heat distortion temperature, can be obtained. For example, the articles made from an acrylic resin composition include nameplates or dialplates for television sets, dust covers for stereo phonographs, soy sauce pots, daily necessaries such as a cup, plates formed by extrusion molding and displays made therefrom, sign devices formed by vacuum molding, covers for illumination devices formed by blow molding, etc. Such molded articles are often subjected to further fabrications including printing or painting, adhering, drilling, bending, etc. according to the purpose of use.

The articles made of conventional acrylic resin compositions are poor in solvent resistance. The term "solvent resistance" used herein means that any crazing does not occur even when the article molded from the resin composition is contacted, at its portions subjected to fabrication such as heat bending or drilling, with a solvent, such as dichloromethane or xylene. The articles molded from the conventional acrylic resin compositions are limited with respect to further fabrication, and it is difficult to provide a fabricated acrylic resin article having excellent characteristics inherent of the acrylic resin.

On the other hand, the conventional acrylic resin compositions having an average molecular weight of 600,000 to 4,000,000 are difficult to mold, and especially, it is quite impossible to obtain articles from them by injection molding, extrusion molding and blow molding. It is only possible to obtain articles from such relatively high molecular weight acrylic resin composition by producing a plate using a cast method, followed by vacuum molding. With the vacuum molding, however, it is impossible to effect deep drawing or to obtain an article having an acute angle. The article made from the acrylic resin composition having a molecular weight of 600,000 to 4,000,000 is, on the other hand, excellent in solvent resistance and therefore is not limited with respect to further fabrication. Whereas, the cast plate made from the acrylic resin composition having a molecular weight of less than 600,000 can be easily molded by vacuum molding to obtain a product similar in quality to an extrusion plate, but the solvent resistance thereof is reduced to the same level as that of the extrusion plate, losing excellent characteristics inherent of a cast plate.

With a view to developing a solvent resistant acrylic resin composition capable of providing a fabricated article in which there is no occurrence of solvent-crazing, various studies had been made and there was proposed a acrylic resin composition for extrusion molding which comprises methyl methacrylate and a $C_1$–$C_8$ alkyl ester of acrylic acid (Japanese patent application laid-open specification No. 12381/1973). However, it was revealed that the plate from such resin composition is deficient in transparency. The plate has slight haze, rendering the article made therefrom poor in characteristics inherent of acrylic resin.

In order to overcome the above-mentioned defects of the conventional acrylic resin compositions, extensive and intensive studies have been made and, as a result, it has been found that an article free of haze can be obtained from an acrylic resin composition comprising an alkyl ester of acrylic acid, methyl acrylate and methyl methacrylate. Further, it has surprisingly been found that a three-component composition of methyl methacrylate with both an alkyl ester of acrylic acid and methyl acrylate is rather high with respect to heat distortion temperature than a two-component composition of methyl methacrylate with either an alkyl ester of acrylic acid or methyl acrylate. For this reason, it has become possible to employ an acrylic resin composition of a relatively low molecular weight type which cannot be employed in, for example Japanese patent application laid-open specification No. 12381/1973, and this leads to an improvement in production efficiency such as an extrusion amount. Further, when the present three-component acrylic resin composition is injection-molded or blow-molded into a shaped article, the article is excellent in solvent resistance even upon being fabricated, as compared with the articles molded from the conventional acrylic resin composition. This invention has been made, based on such novel findings.

The foregoing and other objects, features and advantages of the present invention will be apparent to those skilled in the art from the following detailed description and the accompanying drawing in which:

The FIGURE is a triangular diagram in which the region covered by the present invention is shown by hatching.

According to the present invention, there is provided a solvent resistant acrylic composition which comprises (A) at least 1% by weight, based on the total weight of the components (A), (B) and (C), of monomer units of at least one of ($C_3$-$C_8$) alkyl esters of acrylic acid, (B) methyl acrylate monomer units and (C) 80 to less than 90% by weight, based on the total weight of the components (A), (B) and (C), of methyl methacrylate; the amount of the component (B) being the same as or more than that of the component (A).

The ($C_3$-$C_8$) alkyl esters of acrylic acid to be employed in the present invention can be easily obtained from acrylic acid and the corresponding alcohol having 3 to 8 carbon atoms. The term "alkyl" used herein is intended to include unsubstituted or substituted straight chain or branched chain alkyls and unsubstituted or substituted cycloalkyls. Specific examples of the ($C_3$-$C_8$) alkyl esters of acrylic acid to be employed in the present invention include n-propyl acrylate, iso-propyl acrylate, n-butyl acrylate, iso-butyl acrylate, n-amyl acrylate, n-hexyl acrylate, cyclohexyl acrylate, n-heptyl acrylate, n-octyl acrylate and 2-ethylhexyl acrylate. n-Butyl acrylate is especially preferred. A solvent resistant acrylic resin composition of the present invention may be prepared by copolymerizing at least three component monomers, namely, (A) at least one of ($C_3$-$C_8$) alkyl esters of acrylic acid, (B) methyl acrylate and (C) methyl methacrylate. The component (A) may suitably be employed in an amount of at least 1% by weight based on the total weight of the components (A), (B) and (C). The component (C) may suitably be employed in an amount of 80 to less than 90% by weight, more preferably 82 to 88% by weight based on the total weight of the components (A), (B) and (C). The amount of the component (B) may suitably be the same as or more than that of the component (A). The resin composition of the present invention is included in the region shown by hatching in the triangular diagram of the FIGURE.

In the acrylic resin composition of the present invention, there may be incorporated other monomers copolymerizable with said component monomers (A), (B) and (C). The amount of other copolymerizable monomers to be employed may be varied depending on the kind of monomer but usually in the range of 1 to 10% by weight based on the total weight of the components (A), (B) and (C). As other copolymerizable monomers, there can be mentioned ethyl acrylate, stearyl methacrylate, styrene, acrylonitrile and vinyl acetate. Besides, there may be incorporated suitable additives, such as plasticizer, thermal stabilizer, light stabilizer, fire retarding agent, antistatic agent and the like, and known coloring agents such as pigment, dye and the like. Representative examples of the plasticizers include dibutyl phthalate, dioctyl phthalate, cetyl alcohol and stearyl alcohol. The amounts of the additives and the coloring agents may be varied depending on the kind but usually in the range of 0.001 to 10% by weight based on the total weight of the components (A), (B) and (C).

When the sum of the amounts of components (A) and (B) is less than 10% by weight based on the total weight of the components (A), (B) and (C), the resin composition is insufficient in solvent resistance. While, when the sum of (A) and (B) is more than 20%, the resin composition is not good with respect to heat distortion temperature. When the resin composition has a heat distortion temperature of less than 85° C. [measured according to ASTMD-648-56 (loading stress: 264 p.s.i.)], it is not practically preferable.

When the amount of the component (A) is more than that of the component (B), the resin composition is caused to have haze, leading to loss of transparency, one of the important characteristics of acrylic resin. The haze, if any, can be easily observed by letting light pass through the 10 cm or more-long molded article with its both ends polished smoothly, or by seeing through the articles which have been formed by cutting the molding into suitably-sized ones and laying them on one another to have a length of 10 cm or more. When the degree of haze measured according to ASTMD 1003-61 is 1.5% or more, it is observed as being hazing. The scratch and stain on the surface of a test specimen delicately effects the test of haze, and therefore, most careful attention is needed to avoid such scratch and stain.

As described before, the essential feature is that both an alkyl ester of acrylic acid and methyl acrylate are present together with methyl methacrylate in the composition. The copolymer of methyl methacrylate with either an alkyl ester of acrylic acid or methyl acrylate not only tends to cause haze but also does not give a satisfying heat distortion temperature when the copolymer has an average molecular weight of 100,000 to 150,000 in which good production efficiency can be attained.

The analysis of the monomer component in the acrylic resin composition may be done using a pyrolysis gas chromatography. In that analysis each of the monomer component and its decomposition products are detected, and hence it is preferred to employ a calibration curve prepared using a standard polymer of known composition so that the accurate determination can be done.

In the present invention, an average molecular weight is not critical but is preferably in the range of 100,000 to 600,000 for molding. When the molecular weight is lower than 100,000, the resin composition is poor in mechanical strength and insufficient in heat distortion temperature. Whereas, when the molecular weight is higher than 600,000, even though it is not critical, the resin composition is caused to have a low fluidity, leading to difficulty in molding.

On the other hand, when a cast method is employed for the production of an acrylic resin composition of the present invention, the average molecular weight of 100,000 to 4,000,000 gives excellent properties with respect to heat distortion temperature, solvent resistance and non-hazing. Even with the resin composition having an average molecular weight as large as 4,000,000, due to its good vacuum moldability, there can be obtained good shaped article with a deep drawing and a good mold reproducibility as attained in the ordinary extrusion plate. The reason for this is not exactly known, but it is believed that the acrylic resin composition of the present invention is soft at high temperatures.

In the polymerization of an acrylic resin composition of the present invention, a known polymerization initiator is added to the aforementioned monomer mixture, and a known chain transfer agent is further added if control of the molecular weight is required. The polymerization is conducted at an appropriate temperature. Examples of the known initiators include peroxide catalysts such as benzoyl peroxide, lauroyl peroxide, t-butyl perbenzoate, methyl ethyl ketone peroxide and the like, and azo catalysts such as azobisisobutyronitrile, azobis(dimethylvaleronitrile) and the like. The concentration of a catalyst to be used may be in the range of 0.01 to 1.0% by weight based on the monomer mixture. Taking into account the activity of the polymerization initiator, and the boiling points of methyl methacrylate (100° C.) and methyl acrylate (80° C.), the polymerization temperature may preferably be in the range of 50° to 80° C. After the rapid progress (peak) of the reaction, the polymerization temperature is usually elevated to 80° to 130° C. to complete the polymerization. The concentration of the polymerization initiator and the polymerization temperature may be controlled in order to control the molecular weight, but with a poor reproducibility. Therefore, a chain transfer agent may be advantageously employed to control the molecular weight. As a chain transfer agent, there can be employed a mercaptan such as n-dodecylmercaptan, n-octylmercaptan, n-butylmercaptan or the like, carbon tetrachloride, an alkyl thioglycolate, benzyl chloride or the like. Since with a small amount of the mercaptan the molecular weight can be effectively controlled, the mercaptan may advantageously be employed. When the polymer of a molecular weight of 100,000 to 600,000 is intended, the amount of a chain transfer agent, for example in case n-dodecylmercaptan is employed, may preferably be in the range of 0.08 to 0.5% by weight based on the monomer mixture. In case other chain transfer agent is employed, the amount thereof to be needed can be easily determined referring to the chain transfer constant as described in "Polymer Handbook, II" edited by J. Brandrup et al. and published by Interscience Publisher, pages 100–105 and 126–128. Generally stated, the higher the chain transfer constant, the smaller the amount of the agent may be, whereas the lower the chain transfer constant, the larger the amount of the agent may be.

The polymerization may be conducted using a radical polymerization method known in the production of an acrylic resin compositions, such as suspension polymerization, bulk polymerization or the like.

The molecular weights shown in this specification were calculated from intrinsic viscosities $[\eta]$ at 25° C. of chloroform solutions of the acrylic resin compositions, using the following equation. Intrinsic viscosities were examined using Ostwald's viscometer which is commonly employed.

$[\eta] = K M_w^{\alpha}$
$K = 4.85 \times 10^{-6}$
$\alpha = 0.80$ $Mw$ = viscosity-average molecular weight According to this invention, as described, there is provided an acrylic resin composition and molded articles produced therefrom which have solvent resistance as excellent as that of the acrylic resin articles produced by the conventional cast method.

The following examples illustrate the invention in more detail.

EXAMPLE 1

1.5 kg. of sodium polyacrylate, 850 g. of disodium hydrogenphosphate and 50 g. of sodium dihydrogenphosphate were added to 150 liters of pure water and the mixture was stirred at 30° to 35° C. with heating until the liquid became transparent, to form a aqueous phase. On the other hand, methyl methacrylate, methyl acrylate and at least one of n-propyl acrylate, n-butyl acrylate, 2-ethylhexyl acrylate, n-octyl acrylate and ethyl acrylate were mixed in accordance with the formulations shown in Table 2 so that the total weight of the mixture was 50 kg. To the mixture were added n-dodecylmercaptan of an amount indicated in Table 1 and 500 g. of benzoyl peroxide and the mixture were well stirred to form a monomer phase. The monomer phase was added to the aqueous phase and the mixture was well stirred to obtain a suspension. The air in the vessel was replaced by nitrogen, and, while the mixture being kept in the suspended state, the polymerization was conducted at 76° to 78° C. for 3 hours. For completion of the reaction, the reaction temperature was elevated to 95° C. and kept at 95° C. for 2 hours. The reaction mixture was cooled to room temperature. The spherical copolymer beads with an average diameter of 0.2 mm were recovered by filtration, washed several times with distilled water and dried.

The relation between the amount of n-dodecylmercaptan used and the molecular weight of the copolymer obtained is shown in Table 1.

Table 1

| Amount of n-dodecylmercaptan used, g. | Molecular weight, ten thousand |
|---|---|
| 500 | 10 |
| 215 | 16 |
| 110 | 25 |
| 55 | 45 |
| 35 | 70 |

The monomer composition ratio of the obtained copolymer was examined by a pyrolysis type gas chromatographic analysis and found to coincide with the concentration ratio of the charged monomer mixture, with the error in the range of ±0.2%.

The copolymer was extruded using an extruder (P40-30AB-V type; manufactured and sold by Nihon Seikosho Co., Ltd., Japan) and a T die, and cooled using a metallic roll to give a plate having a width of 20 cm and a thickness of 3 mm. The temperatures of the cylinder of the extruder and the T die were controlled at a temperature in the range of 210° to 250° C. and the temperature of the metallic roll in the range of 80° to 100° C. The amount of the copolymer extruded per 1 hour was calculated from the weight of the plate produced per a unit time and is shown in Table 2.

The heat distortion temperature of the obtained plate was examined in accordance with ASTM 648-56 (loading stress: 264 p.s.i.) and is shown in Table 2. The hazing of the plate was examined in accordance with ASTM D 1003-61 and is shown in Table 2. Further, the plate was heated from one side of it using a pipe-shaped electric heater. When the temperature of the opposite side of the plate reached 120° C., the plate was perpendicularly bended with the heated face on the outside and cooled to room temperature. Thereupon, dichloromethane was applied onto the bended portion and it was observed whether a craze occurred or not. The result is also shown in Table 2.

The copolymers No. 4 and No. 15 shown in Table 2 were injection-molded using a injection molding machine (IS-80AM; manufactured and sold by Toshiba Kikai Co., Ltd., Japan) to give discoidal moldings having a diameter of 20 cm and a thickness of 3 mm. The temperature of the cylinder of the injection molding machine was 230° C., the injection pressure 1,000 kg./cm² and the temperature of the mold 50° C. The obtained moldings were transparent and excellent in luster. These moldings were drilled at their respective centers, using a drill rotating at 900 r.p.m., to form holes having a diameter of 15 mm. Xylene was applied to the respective peripheries of the holes but no craze occurred.

The copolymers No. 2 and No. 8 were blow-molded using a blow molding machine (SV-3; manufactured and sold by Placo Co., Ltd., Japan) to give hollow cylindrical moldings having a diameter of 5 cm, a length of 10 cm and a thickness of 0.5 mm. The temperature of the cylinder of the blow molding machine was 210° C. and the temperature of the mold was 60° C. These moldings were drilled at their respective centers, using the drill rotating at 900 r.p.m., to form holes having a diameter of 15 mm. Xylene was applied to the respective peripheries of the holes but no craze occurred.

Table 2

| Experiment No. | MMA weight, % | MA weight, % | EA weight, % | n-PA weight, % | n-BA weight, % | 2EHA weight, % | n-OA weight, % | Molecular weight, ten thousand | Amount extruded, kg./hr. | Heat distortion temperature, °C. | Hazing, % | Craze |
|---|---|---|---|---|---|---|---|---|---|---|---|---|
| 1 | 80 | 12 | 0 | 8 | 0 | 0 | 0 | 45 | 8 | 86 | 1.3 | None |
| 2 | 80 | 10 | 0 | 0 | 10 | 0 | 0 | 45 | 8 | 85 | 1.3 | None |
| 3 | 80 | 15 | 0 | 0 | 5 | 0 | 0 | 25 | 10 | 85 | 1.3 | None |
| 4 | 82 | 15 | 0 | 0 | 3 | 0 | 0 | 16 | 15 | 85 | 1.3 | None |
| 5 | 82 | 15 | 0 | 0 | 3 | 0 | 0 | 25 | 10 | 87 | 1.3 | None |
| 6 | 82 | 15 | 0 | 0 | 3 | 0 | 0 | 45 | 8 | 88 | 1.3 | None |
| 7 | 84 | 10 | 0 | 3 | 3 | 0 | 0 | 16 | 15 | 87 | 1.3 | None |
| 8 | 84 | 10 | 0 | 0 | 3 | 3 | 0 | 16 | 15 | 86 | 1.3 | None |
| 9 | 85 | 10 | 0 | 0 | 5 | 0 | 0 | 16 | 15 | 87 | 1.3 | None |
| 10 | 87 | 8 | 0 | 0 | 5 | 0 | 0 | 16 | 15 | 87 | 1.3 | None |
| 11 | 87 | 8 | 0 | 0 | 5 | 0 | 0 | 25 | 10 | 88 | 1.3 | None |
| 12 | 87 | 8 | 0 | 0 | 5 | 0 | 0 | 45 | 8 | 87 | 1.3 | None |
| 13 | 87 | 8 | 0 | 0 | 0 | 5 | 0 | 16 | 15 | 87 | 1.3 | None |
| 14 | 87 | 8 | 0 | 0 | 0 | 0 | 5 | 16 | 15 | 86 | 1.3 | None |
| 15 | 88 | 10 | 0 | 0 | 2 | 0 | 0 | 10 | 15 | 88 | 1.3 | None |
| 16 | 87 | 6 | 2 | 0 | 5 | 0 | 0 | 16 | 15 | 87 | 1.3 | None |

Note:
MMA:Methyl methacrylate
MA:Methyl acrylate
EA:Ethyl acrylate
n-PA:n-Propyl acrylate
n-BA:n-Butyl acrylate
2EHA:2-Ethylhexyl acrylate
n-OA:n-Octyl acrylate

COMPARATIVE EXAMPLE 1

A copolymer comprising methyl methacrylate, methyl acrylate and n-butyl acrylate was prepared and extruded using the extruder to give a plate, by substantially the same procedures as described in Example 1. In the same manners as described in Example 1, there were examined the heat distortion temperature, the hazing, and whether a craze occurred or not when dichloromethane was applied onto the plate at its portion heated and bended. The results are shown in Table 3 together with the extrusion amount and the molecular weight of the copolymer. While, it is noted that the amounts of the copolymer No. 3 and No. 15 extruded were extremely small, and hence no plate could virtually be produced therefrom.

Table 3

| Experiment No. | MMA weight, % | MA weight, % | n-BA weight, % | Molecular weight, ten thousand | Amount extruded, kg./hr. | Heat distortion temperature, °C. | Hazing, % | Craze | Remarks |
|---|---|---|---|---|---|---|---|---|---|
| 1 | 75 | 20 | 5 | 16 | 15 | 76 | 1.3 | None | |
| 2 | 75 | 20 | 5 | 45 | 8 | 78 | 1.3 | None | |
| 3 | 75 | 20 | 5 | 70 | | | | | impossible to extrude |
| 4 | 80 | 0 | 20 | 16 | 15 | 70 | 10.5 | None | |
| 5 | 80 | 5 | 15 | 16 | 15 | 80 | 3.0 | None | |
| 6 | 80 | 20 | 0 | 16 | 15 | 74 | 2.5 | None | |
| 7 | 85 | 0 | 15 | 16 | 15 | 78 | 5.3 | None | |
| 8 | 85 | 7 | 8 | 16 | 15 | 85 | 1.8 | None | |
| 9 | 85 | 15 | 0 | 16 | 15 | 80 | 1.6 | None | |
| 10 | 87 | 5 | 8 | 16 | 15 | 86 | 2.0 | None | |
| 11 | 90 | 0 | 10 | 16 | 15 | 87 | 4.3 | None | |
| 12 | 90 | 4 | 6 | 16 | 15 | 90 | 2.2 | None | |
| 13 | 90 | 10 | 0 | 16 | 15 | 89 | 1.3 | Observed | |
| 14 | 90 | 10 | 0 | 45 | 8 | 91 | 1.3 | Observed | |
| 15 | 90 | 10 | 0 | 70 | | | | | impossible to extrude |

Table 3-continued

| Experiment No. | MMA weight, % | MA weight, % | n-BA weight, % | Molecular weight, ten thousand | Amount extruded, kg./hr. | Heat distortion temperature, °C. | Hazing, % | Craze | Remarks |
|---|---|---|---|---|---|---|---|---|---|
| 16 | 93 | 5 | 2 | 16 | 15 | 95 | 1.3 | Observed | |

Note: MMA, MA, and n-BA have the same meaning as in the note of Table 2.

EXAMPLE 2

0.45 g. of azobisisobutyronitrile was added to a mixture of 765 g. of methyl methacrylate, 90 g. of methyl acrylate and 45 g. of n-butyl acrylate. The mixture was well stirred and degased for 1 minute in vacuo to give a mixed monomer phase. The mixed monomer phase was poured into the space between two plates of glass disposed parallel to each other with a tube of polyvinyl chloride provided therebetween, heated at 55° C. for 6 hours and then at 110° C. for 3 hours, and cooled, followed by removing the glass plates, to give a cast plate which is transparent and has a length of 500 mm, a width of 500 mm and a thickness of 3 mm.

The molecular weight of this copolymer was 2,500,000. The heat distortion temperature of the plate was 87° C. and the hazing was 1.3%. Dichloromethane was applied onto the plate at its portion heated and bended, but no craze was observed at all.

The mold reproducibility of the plate in vacuum molding was examined. There was employed a mold having a length of 200 mm, a width of 200 mm and a depth 30 mm and having a curvature of 3 mmR at its floor corner. Heating was conducted from both sides of the plate and continued until the surface temperature of the plate reached a given temperature. The mold reproducibility was expressed as the reproducibility of curvature, which was calculated from the following equation.

$$\text{reproducibility of curvature} = \frac{\text{radius of curvature of wooden mold}}{\text{radius of curvature of moldings}} \times 100 \, (\%)$$

The mold reproducibility of the cast plate of this example was high as shown below:

| | |
|---|---|
| The reproducibility at a surface temperature of the plate of 165° C. | 80% |
| The reproducibility at a surface temperature of the plate of 175° C. | 85% |

COMPARATIVE EXAMPLE 2

In the same manner as described in Example 1 and 2, the plates were examined with respect to the heat distortion temperatures, the hazings and the solvent-crazings of the portion heated and bended and of the portions drilled by the drill, and with respect to the reproducibilities of curvature in vacuum molding. For the examinations, there were employed a commercial plate produced by extrusion molding (molecular weight, 150,000: a copolymer of methyl methacrylate and 3% of methyl acrylate) and a commercial plate produced by a cast method (molecular weight, 2,500,000: a polymer of methyl methacrylate alone). The results are shown in Table 5.

Table 5

| | Commercial extrusion plate | Commercial cast plate |
|---|---|---|
| Heat distortion temperature, °C. | 97 | 103 |
| Hazing | 1.3 | 1.3 |
| Craze | | |
|   Heated and bended (contacted with dichloromethane) | Observed | None |
|   drilled hole (contacted with xylene) | Observed | None |
| Reproducibility of curvature, % | | |
|   at surface temperature of 165° C. | 83 | 45 |
|   at surface temperature of 175° C. | 87 | 50 |

What is claimed is:

1. A solvent resistant acrylic polymer having a viscosity-average molecular weight of 100,000 to 4,000,000 determined according to the formula $[\eta]=KM_w^\alpha$ where:

$M_w$ = viscosity-average molecular weight
   $K = 4.85 \times 10^{-6}$
   $\alpha = 0.80$
   $[\eta]$ = intrinsic viscosity of chloroform solutions of the acrylic [resin composition] polymer at 25° C., and consisting essentially of (A) at least 1% by weight, based on the total weight of the components (A), (B) and (C), of monomer units of at least one of ($C_3$-$C_8$) alkyl esters of acrylic acid; (B) methyl acrylate monomer units; and (C) 80 to less than 90% by weight, based on the total weight of the components (A), (B) and (C), of methyl methacrylate monomer units; the amount of the component (B) being the same as or more than that of the component (A).

2. A solvent resistant acrylic polymer according to claim 1, wherein said alkyl is an unsubstituted or substituted straight chain or branched chain alkyl or an unsubstituted or substituted cycloalkyl.

3. A solvent resistant acrylic polymer according to claim 2, wherein said at least one of ($C_3$-$C_8$) alkyl esters of acrylic acid is n-propyl acrylate, iso-propyl acrylate, n-butyl acrylate, iso-butyl acrylate, n-amyl acrylate, n-hexyl acrylate, cyclohexyl acrylate, n-heptyl acrylate, n-octyl acrylate or 2-ethylhexyl acrylate.

4. A solvent resistant acrylic polymer according to claim 1, wherein said resin composition has a viscosity-average molecular weight of 100,000 to 600,000.

5. A solvent resistant acrylic polymer according to claim 1, which is in the form of a plate molded by extrusion molding.

6. A solvent resistant acrylic polymer according to claim 1, which is in the form of an article molded by injection molding.

7. A solvent resistant acrylic polymer according to claim 4, which in the form of a plate formed by extrusion molding.

8. A solvent resistant acrylic polymer according to claim 4, which is in the form of an article formed by injection molding.

* * * * *